United States Patent Office 3,644,508
Patented Feb. 22, 1972

---

3,644,508
PROCESS FOR THE RECOVERY OF GLYOXYLIC ACID
Robert H. Callighan, Penn Hills Township, Allegheny County, and Philip X. Masciantonio, Penn Township, Westmoreland County, Pa., assignors to United States Steel Corporation
No Drawing. Filed July 23, 1969, Ser. No. 844,160
Int. Cl. C07c 51/42
U.S. Cl. 260—526 R                     5 Claims

ABSTRACT OF THE DISCLOSURE

Glyoxylic acid is recovered from the solution resulting when the hydroperoxide is formed by reacting maleic acid with ozone in a solvent. The hydroperoxide in the solution has its free oxygen reduced with sulphur dioxide to form sulphur trioxide. The sulphur trioxide is then precipitated by reaction with an alkaline earth metal oxide or other precipitating agent and the glyoxylic acid product is then easily separated from the precipitate.

---

This invention relates to a process for the preparation of glyoxalic acid and more particularly to an improved process for the recovery of glyoxylic acid from crude solutions thereof.

It has been known for a long time that glyoxalic acid derivatives can be prepared by first reacting maleic acid with ozone and water, but heretofore no satisfactory process has existed for isolating the glyoxalic acid per se from the reaction mixture which is initially formed. A process has been proposed by William T. Black and Gerhard A. Cook in I&EC Product Research and Development, volume 5, page 350, December 1966. This process involves treating an aqueous solution of maleic acid with ozone and then isolating the glyoxylic acid in fairly high purity by distilling off formic acid and water at reduced pressure at 50° C., leaving glyoxylic acid monohydrate with a purity greater than 97% behind. The difficulty with the process which prevents it from being commercially attractive is that only a 50% yield of the glyoxylic acid based on the maleic acid starting material is obtained since half of the product is decomposed during the isolation procedure to remove the formic acid and water.

It is, therefore an object of this invention to provide an improved process for the isolation of glyoxalic acid. Another object of this invention is to provide an improved yield of glyoxylic acid when prepared by the ozonolysis of maleic acid and reduction of the active oxygen in the resulting hydroperoxide.

The foregoing objects and others which will become apparent from the following description are accomplished in accordance with this invention by providing a process of recovering glyoxylic acid from the hydroperoxide prepared by reacting maleic acid with ozone in an ionic or participating solvent by treating said hydroperoxide with sulphur dioxide to form sulphur trioxide. The resulting solution containing sulphur trioxide is then reacted with a precipitating agent which is not reactive to glyoxylic acid in the presence of $SO_3$ such as an oxide or carbonate of a metal of Group II–A of the Periodic Table of Elements. The glyoxylic acid is then easily removed by simple separation from the precipitate.

Any suitable ionic or participating solvent may be used in the processs of this invention. Acetone is the preferred solvent but one may also use water, low molecular weight esters such as ethyl acetae, methyl propionate and methyl acetate as well as other ketones such as methyl ethyl ketone, diethyl ketone, methyl isopropyl ketone and the like. Furthermore, alcohols and acids may be used as the solvent in which case an alkoxy hydroperoxide intermediate will be formed but is readily converted to the glyoxylic acid monohydrate if water is also present, when the intermediate is contacted with sulphur dioxide. Any suitable alcohol may be used but for economic reasons it is preferred to use monohydric alcohols containing 1 to 8 carbon atoms such as, for example, methanol, ethanol, propanol, 1-butanol, tertiary butanol, tertiary amyl alcohol, 2-hexanol, 3-heptanol, octonol and the like. Any suitable acid may be used but it is preferred to use monocarboxylic acids such as, for example, acetic acid, propionic acid, butyric acid, valeric acid, caproic acid, enanthic acid, caprylic acid and the like.

Anything that will precipitate the $SO_3$ formed when the $SO_2$ reacts with the oxygen of the hydroperoxide may be used provided that it will not react with the glyoxylic acid in the presence of the $SO_3$. The precipitating agent must be one that will not react with the glyoxylic acid. This is the main difficulty with the prior art process since almost all reducing agents for the active oxygen of the hydroperoxide are as reactive with the carboxylic group and react therewith to produce a reaction product which must be isolated in a separate step. This process, however, is unique in that the sulphur dioxide reacts preferentially with the oxygen of the hydroperoxide to produce a solution from which the glyoxylic acid can be conveniently and easily isolated. It is preferred, however, to use an oxide or carbonate of a metal of Group II–A of the Periodic Table of Elements such as, for example, calcium oxide which is preferred, as well as calcium carbonate, magnesium oxide, magnesium carbonate, barium oxide, barium carbonate and the like.

In carrying out the process of the invention maleic acid is first dissolved in a suitable ionic or precipitating solvent which preferably contains a small of water and the solution is cooled preferably below about 10° C. It is best to carry out the initial ozonation at a temperature between 0 and 10° C. The amount of solvent used should be sufficient to completely dissolve the maleic acid but otherwise the amount of solvent is within the discretion of the operator, keeping in mind that excess solvent must be separated from the product. The ozone may be generated from any convenient source and may be oxygen containing about 4 weight percent ozone such as is obtained from commercially available ozonators. The theoretical amount of ozone required is one molecular equivalent; however, ozone absorption is not quantitative and some unreacted ozone escapes during the reaction. Therefore, it is preferred to use an excess, preferably at least about 1.1 molecular equivalents of ozone per molecular equivalent of maleic acid.

After the hydroperoxide is formed, sulphur dioxide, preferably gaseous sulphur dioxide, is added to react with the active oxygen of the hydroperoxide in at least an amount equivalent to react with all of the active oxygen. Any excess may be used but there is no advantage to using more than is equivalent to the active oxygen, and it is preferred to use only enough sulphur dioxide to completely destroy the active oxygen.

The decomposition of the hydroperoxide is highly exothermic and it is preferred to carry out the reaction thereof with the $SO_2$ at a temperature below about 30° C. When the hydroperoxide has been destroyed, the reaction mixture will no longer exotherm and the sulphur trioxide formed can then be precipitated as set out below.

Any suitable precipitating agent may be used as pointed out above but it is preferred to use calcium oxide since calcium oxide in the presence of a small amount of water will precipitate calcium sulphate as the stable dihydrate. One should only use enough of the precipitating agent to react with the sulphur trioxide since most of the precipitating agents will also react with the glyoxylic acid after all of the active oxygen of the hydroperoxide has reacted.

Thus the addition of excess calcium oxide will allow the formation of the calcium salt of glyoxylic acid. In practice it is preferred to add only 0.9 to 1 molecular equivalent of the precipitating agent per equivalent of $SO_3$ in the reaction mixture. After the precipitation is complete, it can be removed by simple filtration or decanting the solution of glyoxylic acid therefrom. The glyoxylic acid may then be isolated by removal of the solvent by evaporation or distillation.

Glyoxylic acid is useful for the preparation of the medicinal, Allantoin. It is also possible to decompose glyoxylic acid by heating it with nitric acid to prepare oxalic acid which finds use in the preparation of permanent press garments and in the processing of rare earths for color-television tubes.

The invention is further illustrated by the following examples:

EXAMPLE I

A solution is prepared by dissolving about 11.6 g. (0.1 mole) of maleic acid in a mixture of about 195 ml. of ethyl acetate and about 5 ml. of water and the solution cooled to about 5° C. (ice-$H_2O$ bath). A finely dispersed stream of an ozone-oxygen mixture containing about 4 weight percent ozone was passed into the solution with good stirring until about 5.3 g. (0.11 mole) of ozone had been added. The ozone absorption was not quantitative. While still at about 5° C., the colorless solution was swept with oxygen to remove any dissolved ozone. Gaseous sulphur dioxide was then bubbled into the solution for about 3 minutes. The reaction was highly exothermic, and the temperature was kept below about 30° C. by periodic addition of the sulphur dioxide. Sulphur dioxide addition was continued until the solution gave a negative test for peroxide, using starch-iodide paper. When the solution had again cooled to about 5° C., about 5.6 g. solid calcium oxide (0.1 mole) was added, followed by about 5 ml. of water. A mild exothermic reaction occurred and the temperature rose to about 10° C. White solids precipitated, and they were collected by filtration and dried. They were identified as calcium sulfate dihydrate by their infrared spectrum. The colorless filtrate was then transferred to a vacuum stripper kept at about 50° C. by a heated water bath. The solvent and excess water were distilled off. There was obtained about 15.9 g. (86% yield) of viscous syrup that was identified as glyoxylic acid monohydrate by its infrared spectrum. The syrup could be made to crystallize by keeping it at about 20° C. for 3 days.

EXAMPLE II

The procedure of Example I is repeated except that about 5.0 g. (0.09 mole) of calcium oxide is used to neutralize the sulphur trioxide. After working up, there is obtained about 16.6 g. (90.2% yield) of glyoxylic acid monohydrate.

EXAMPLE III

The procedure of Example I is repeated except that about 200 ml. of methanol is used as the solvent and about 4.8 g. (0.085 mole) of calcium oxide is used to neutralize the sulphur trioxide. After working up in the usual manner, there is obtained about 19.5 g. (95% yield) of glyoxylic acid hemi-acetal.

EXAMPLE IV

A solution of about 9.8 g. (0.1 mole) of maleic anhydride in a mixture of about 190 ml. of acetone and about 10 ml. water was stirred for about 30 minutes to effect hydrolysis. The solution was cooled to about 5° C. and treated with about 5.3 g. (0.11 mole) of ozone (in oxygen) over a period of about 2 hours and 12 minutes. Ozone absorption was not quantitative. While still at about 5° C., the solution was swept with oxygen, and gaseous sulphur dioxide was bubbled into the solution for about 2 minutes. During addition of the sulphur dioxide (exothermic reaction), the temperature was not allowed to rise above about 23° C. After addition of the sulphur dioxide, the solution gave a negative test for peroxides with starch-iodide paper. About 5.3 g. solid calcium oxide (0.095 mole) was then added followed by about 10 ml. of water and the mixture stirred for several minutes. The insoluble calcium sulfate dihydrate was then removed by filtration. The solvent was then removed in a vacuum stripper kept at about 50° C. by a heated water bath. There was obtained about 18.3 g. (99.5% yield) of a viscous syrup that was identified as glyoxylic acid monohydrate by its infrared spectrum. The syrup slowly crystallized when it was kept at about 20° C. for about 3 days.

It is to be understood that the foregoing working examples are given for the purpose of illustration and that any other suitable precipitating agent, solvent, reaction temperature, separation technique or the like could be substituted therein provided that the teachings of this disclosure are followed.

We claim:

1. A process of recovering glyoxylic acid from the hydroperoxide prepared by reacting maleic acid with ozone in an inert polar solvent which comprises treating said hydroperoxide solution with sulphur dioxide at a temperature below about 30° C. to form sulphur trioxide, precipitating said sulphur trioxide with a precipitating agent which is not reactive to glyoxylic acid in the presence of $SO_3$, said precipitating agent being an oxide or a carbonate of a metal of Group II–A of the Periodic Table of Elements and separating glyoxylic acid from the precipitate.

2. The process of claim 1 wherein said precipitating agent is calcium oxide.

3. The process of claim 1 wherein said solvent is acetone.

4. The process of claim 1 wherein said ozone is employed in an amount of at least 1.1 equivalent per equivalent of maleic acid, said $SO_2$ is employed in on amount approximately equivalent to the active oxygen in said hydroperoxide and said precipitating agent is employed in an amount of from about 0.95 to one equivalent of said $SO_3$.

5. The process of claim 1 wherein said sulphur dioxide is gaseous.

References Cited

R. Hyer Hendricks; Studies in Azonolysis. The Preparation and Properties of Glyoxylic Acid Microfilm Abstracts, vol. 2, No. 2, p. 15 (1940).

Chem. Abstracts, 66: 37373n (1967).

LORRAINE A. WEINBERGER, Primary Examiner

V. GARNER, Assistant Examiner

U.S. Cl. X.R.

260—530 R, 535 R, 542